United States Patent [19]
Christensen et al.

[11] Patent Number: 5,764,634
[45] Date of Patent: Jun. 9, 1998

[54] LAN SWITCH WITH ZERO LATENCY

[75] Inventors: Kenneth J. Christensen, Tampa, Fla.; Francis E. Noel, Durham, N.C.

[73] Assignee: International Business Machines Corporation, Armonk, N.Y.

[21] Appl. No.: 614,714

[22] Filed: Mar. 13, 1996

[51] Int. Cl.$^6$ .................. H04J 3/26; H04L 12/56
[52] U.S. Cl. ............... 370/389; 370/401; 370/428
[58] Field of Search ................ 370/229, 235, 370/236, 237, 357, 360, 389, 392, 395, 396, 400, 401, 402, 403, 404, 405, 406, 407, 428, 429, 445, 446, 463; 340/825.5, 825.51, 825.52; 395/200.01, 200.13, 311, 312, 412, 421.06, 421.11, 435

[56] References Cited

U.S. PATENT DOCUMENTS

| | | | |
|---|---|---|---|
| 4,665,517 | 5/1987 | Widmer | 370/452 |
| 5,140,585 | 8/1992 | Tomikawa | 370/354 |
| 5,151,897 | 9/1992 | Suzuki | 370/401 |
| 5,163,131 | 11/1992 | Row et al. | 395/200.01 |
| 5,251,213 | 10/1993 | Videlock et al. | 370/403 |
| 5,260,936 | 11/1993 | Bardet et al. | 370/428 |
| 5,274,631 | 12/1993 | Bhardwaj | 370/401 |
| 5,285,449 | 2/1994 | Georgiou | 370/401 |
| 5,303,383 | 4/1994 | Neches et al. | 395/500 |
| 5,321,813 | 6/1994 | McMillen et al. | 370/228 |
| 5,333,265 | 7/1994 | Orimo et al. | 395/200.03 |
| 5,355,453 | 10/1994 | Row et al. | 395/200.09 |
| 5,394,402 | 2/1995 | Ross | 370/402 |
| 5,414,704 | 5/1995 | Spinney | 370/389 |
| 5,436,617 | 7/1995 | Adams et al. | 370/254 |
| 5,448,564 | 9/1995 | Thor | 370/392 |

*Primary Examiner*—Alpus H. Hsu
*Attorney, Agent, or Firm*—Joscelyn G. Cockburn

[57] ABSTRACT

A LAN switch includes port modules which receive frames from their respective LAN segments and forwards the frames simultaneously to all output ports and to a port look-up function which determines the output port to which the frames should be forwarded. If the port look-up function identifies the output port, frame transmission is halted at all ports except the identified port. By performing the forwarding function and port look-up function simultaneously, a zero latency switch is provided.

15 Claims, 4 Drawing Sheets

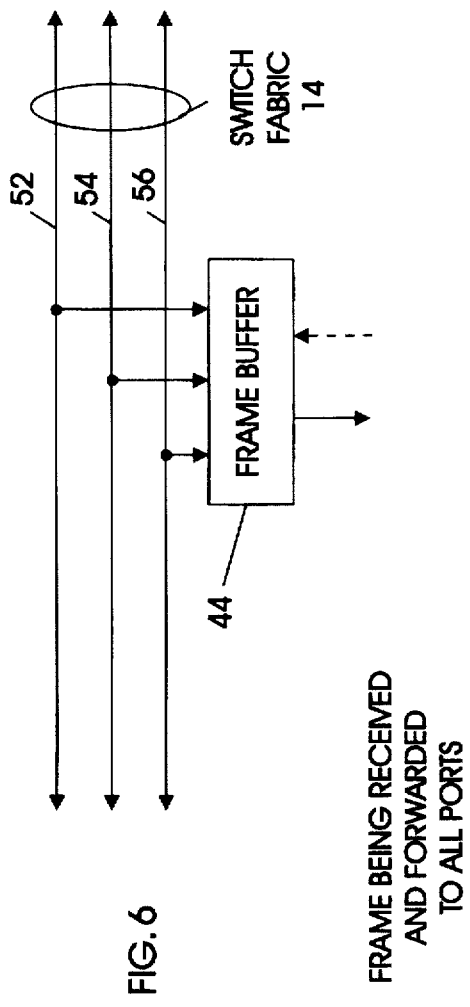
FIG. 6
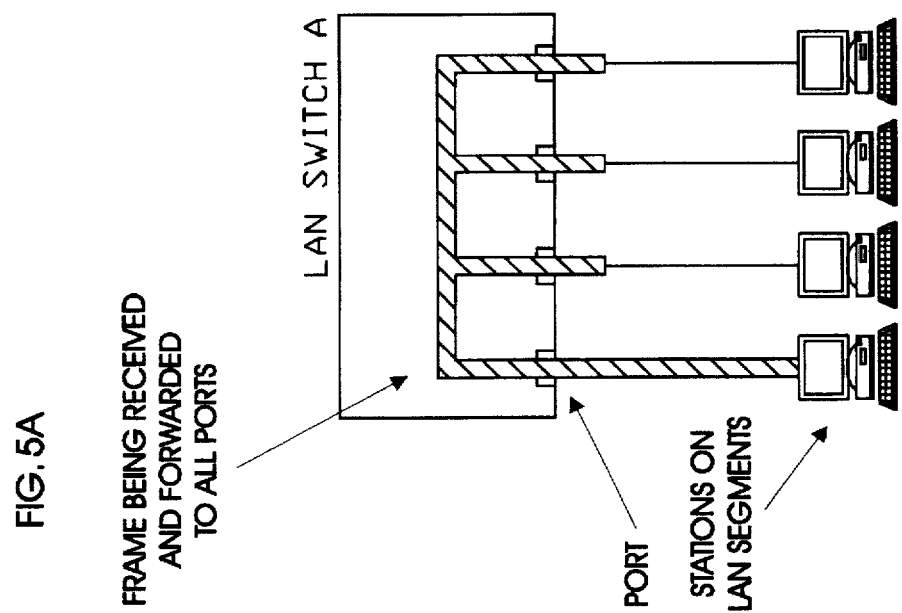
FIG. 5A
FIG. 5B

LAN SWITCH WITH ZERO LATENCY

BACKGROUND OF THE INVENTION

1. Field of the Invention

The present invention relates to Local Area Networks (LANs) in general and, in particular, to switches for configuring and interconnecting said LANs.

2. Prior Art

The use of LAN switches to configure and interconnect LAN segments and individual workstations are well known in the prior art. A conventional LAN switch consists of a plurality of switch ports with each switch port coupled by a dedicated port adapter card to a switching fabric. Each switch port is connected to a LAN segment (shared media supporting a plurality of workstations) or a single workstation. The port adapter card receives LAN frames from its associated port and forwards them to the switching fabric for delivery to stations identified in the frames. The port adapter card also receives LAN frames, from other ports, from the switching fabric and delivers them to the associated port.

In order to forward a frame from a port through the switching fabric to another port, the port adapter card includes a function which examines the six byte destination address in the LAN frame header to determine the exit port to which the frame should be forwarded. The time required to examine the frame before it can be forwarded to an exit port creates the latency which is experienced in prior art switches.

The latency depends on the media rate of the LAN protocol. For example, for 10-Mbps Ethernet LAN, about 16 microseconds are required to fully copy the eight bytes preamble and twelve bytes of the LAN header. Therefore, an existing Ethernet switch cannot begin forwarding an Ethernet frame for at least sixteen microseconds. Because the frame is not forwarded during the period when the header is being examined, this defines the latency (delay) in state-of-the-art switches.

U.S. Pat. No. 5,274,631 describes a switching system in which a plurality of ports are connected through a multiplex logic device. When a source port receives a frame, and has examined the header if it knows the destination port, the frame is forwarded through the multiplex device to the destination port which will significantly reduce system throughput. If the source port does not know the destination port, the frame is sent to the system processor to determine the destination port. In this patent, each port does a look up for the destination port prior to forwarding the frame. Consequently, this prior art patent also suffers from the latency and throughput problems set forth above.

Delay and throughput are two key measures of performance in a communications network. Excessive delay or latency could adversely affect both existing data applications and future multimedia applications. As a consequence, minimizing frame forwarding latency and maximizing throughput are very import design criteria for all network components, especially LAN switches.

SUMMARY OF THE INVENTION

It is, therefore, an object of the present invention to provide a LAN switch which is more efficient than was heretofore been possible.

It is another object of the present invention to provide a zero latency LAN switch.

The zero latency LAN switch is configured so that when a frame is being received at an input port, it is forwarded immediately to all output ports. During the receive at the input port and simultaneously forwarding to all output ports, a port look-up function correlates information in the frame header with information stored at the port to determine an output port. If the output port is determined, the transmission is halted at all other output ports except the identified one. If the other output ports were already busy when the frame was being forwarded, the frame would have been directed to a store-and-forward buffer in this case the "runt" (partial) stored frames are purged (deleted) from the ports output buffer.

BRIEF DESCRIPTION OF THE DRAWINGS

FIGS. 5A and 5B shows a graphical representation of the operation of the present invention.

FIG. 6 shows a selected interconnection between the frame buffer and the switching fabric.

DETAILED DESCRIPTION OF THE PREFERRED EMBODIMENT

Figure 1:
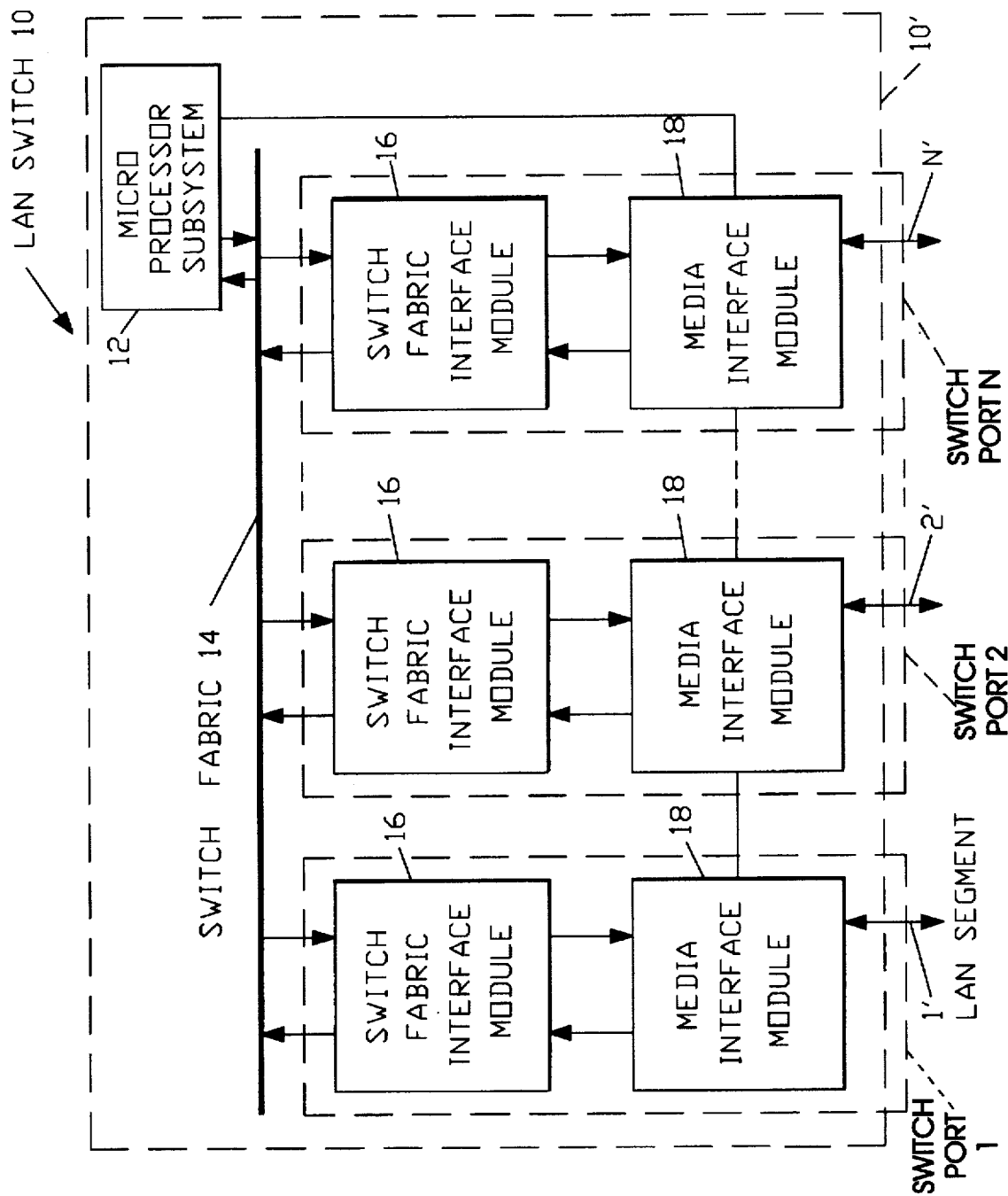
FIG. 1 shows a block diagram of the LAN switch embodying the teachings of the present invention.

FIG. 1 shows a block diagram of the LAN switch according to the teachings of the present invention. The LAN switch 10 includes a housing 10' in which microprocessor subsystem 12, switch fabric 14 and a plurality of switch port cards numbered 1 through N are mounted. Each of the switch port cards interconnects LAN media numbered 1' through N' to the switch fabric 14. Each of the LAN media is connected to a LAN segment and/or a single device. As used in this application, a LAN segment includes a plurality of devices connected to a shared media or to a single device using full-duplex or shared-media protocols. The switching fabric interconnects the switch port cards and transfers LAN frames so that a device connected to one switch port can communicate with another device connected to another switch port. The switch fabric 14 could be a range of switching devices, some as simple as a high speed bus or more complex configuration. Switching fabrics are well known in the prior art, therefore further description is not warranted.

The microprocessor subsystem 12 includes a processor (CPU), RAM, ROM and appropriate management programs which enable the processor to perform management functions. Included in the management functions, of the microprocessor subsystem, is the task of building and distributing address/port table entries to the switch port cards. The structure and functions provided by each of the switch port cards is identical. Therefore, description of one is intended to cover the description of all.

Still referring to FIG. 1, each switch port card includes a switch fabric interface module 16 coupled to LAN media interface module 18. The details of each of these modules will be given subsequently. Suffice it to say at this time, the LAN media interface module 18 contains the appropriate MAC logic and physical layer circuitry and also contains the address/port table which stores addresses and port numbers against which an address in an incoming frame is compared to determine its exit port. Examples of MAC logic and physical layer circuitry would be an Ethernet controller or a Token Ring controller. The switch fabric interface module 16 (details set forth below) contains buffering for outbound frames to the switch fabric 14.

Figure 2:
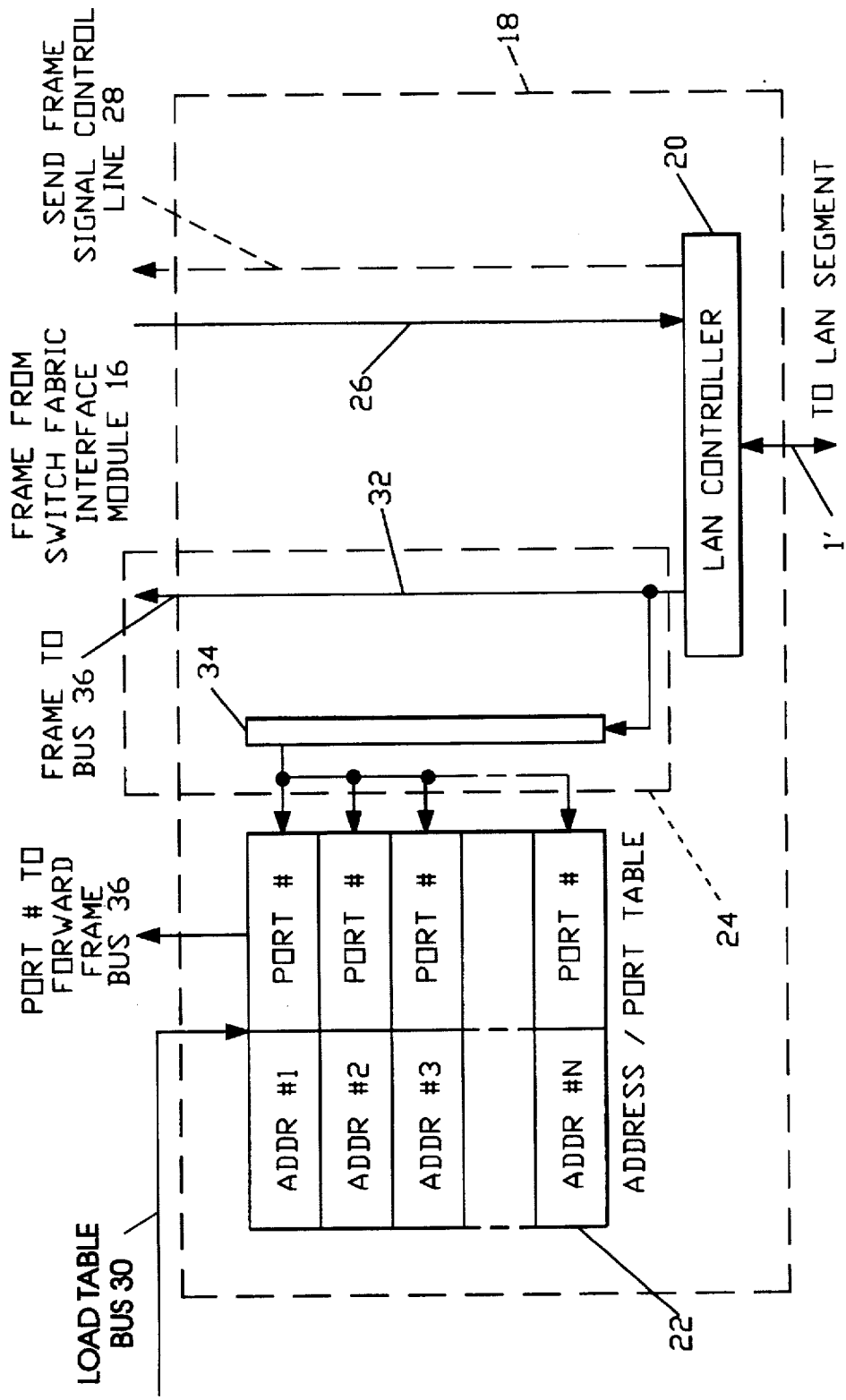
FIG. 2 shows details of a switch port interfacing to the LAN segment according to the teachings of the present invention.

FIG. 2 shows a detailed block diagram for the LAN media interface module 18. The LAN media interface module 18 includes LAN controller 20, address/port table 22 and circuit arrangement 24 for coupling the LAN controller 20 to the address/port table 22. The LAN controller 20 is coupled by media 1' to a LAN segment or device (not shown). Frames from other ports are delivered over bus 26 to LAN controller 20. The send frame signal control line 28 is supplied with a send frame signal from the LAN controller when it requires a frame to be outputted on bus 26.

Still referring to FIG. 2, the LAN controller 20 includes the MAC logic and physical layer circuitry for attaching to a LAN segment for transmitting and receiving frames. The use of the LAN controller for performing such functions are well known in the prior art and a detailed discussion of such a LAN controller is not warranted. Suffice it to say that examples of LAN controllers which can be used includes the Ethernet LAN controller used in the IBM LAN Adapter for Ethernet TP, part number 60G0605 and a Token Ring LAN controller such as the one used in the IBM Token Ring Auto 16/4, part number 92G9352. The LAN controller transmits frames provided on bus 26 from switch fabric interface module 16 onto the LAN segment. The signal "send frame" on the send frame signal control line 28 is off (inactive) if the LAN segment serviced by the LAN controller is busy and is on (active) if the LAN segment is idle and thus ready for a transmit.

Still referring to FIG. 2, the address/port table 22 includes a set of addresses and associated switch port numbers through which the frame is to be forwarded in order to access a device located at the associated address in the headers of the frames. Even though there are a plurality of ways of implementing this table, in the preferred embodiment of this invention, the table is implemented using a Content Address Memory (CAM), details of which will be given hereinafter. The table is set-up by appropriate electrical signals on the load table signal control bus 30. The signals (for loading) are provided by the microprocessor subsystem. The circuity arrangement 24 which couples the LAN controller to the address/port table 22 includes information carrying bus 32 which transmits data (frame) to register 34 and to the switch fabric interface module 16. The frame on bus 32 is presented simultaneously to register 34 and the switch fabric interface module 16. Stated another way, the incoming frame from LAN controller 20 is presented "on the fly" to register 34 where an address to port match is determined while the frame is simultaneously presented to other port buffers connected to the switching fabric. Until a match occurs, the port number to forward a frame is "all ports". This port number is changed to a specific port number if an address-to-port match occurs or remains as "all ports" if no match is found and the frame is determined to be a broadcast frame. The port number to which the frame is to be forwarded if a match occurs is outputted on the line label port number to forward frame bus 36.

Figure 3:
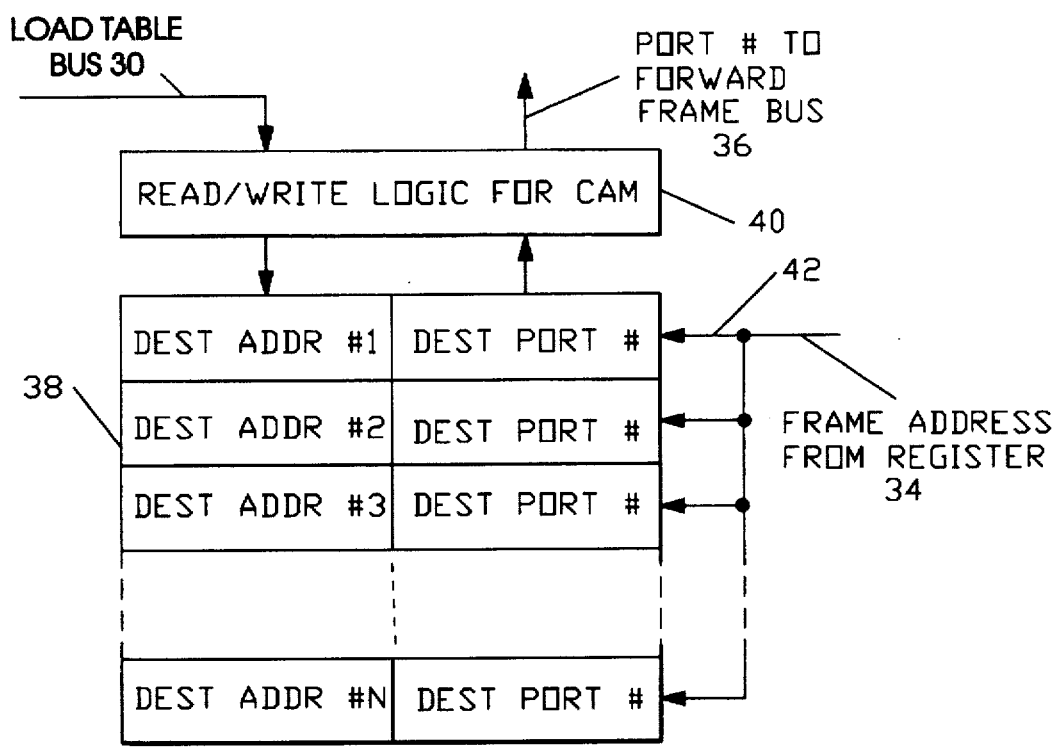
FIG. 3 shows a Content Address Memory (CAM) which implements the address-to-port matching device.

FIG. 3 shows an implementation of the address/port table matching function device 22. The device is implemented as a CAM. Of course, other types of implementation can be generated by one skilled in the art. Such an implementation falls within the scope of the present invention. The CAM includes a storage section 38 and a control section 40. The storage section stores destination address and destination ports while the control section contains read/write logic for the CAM. The address from a frame is outputted from register 34 on bus 42 and is used to "search" the CAM for a matching destination address. If the address is found, then the matching port number is output on bus 36. If the address is not found during the address matching process, the default of all port is output.

Even though the use of the CAM as an address matching device is well known in the prior art, its use in our application is worthwhile discussing. The CAM is a device where data is input and if the data is stored in the device, then the location of this data is output. This location value is correlated to some other stored value (for an example, a port number as is used in this application). The load table information for loading the CAM is outputted on the load table signal line 30 by the microprocessor subsystem. There are a number of ways of determining appropriate destination addresses and destination ports to be loaded in the storage section of the CAM 38. In this embodiment, the microprocessor subsystem "learns" new addresses by observing the source address and source port of frames passing on the high speed bus or other switching fabric. The processor then downloads matching pairs of address/port to the table in each port. The matched pair consists of an address and the port number at which that address is connected. It should be noted that the microprocessor can also remove address/port entries from the port tables. This removal is often referred to as "aging out" inactive addresses. The aging out procedure allows the address/port of inactive stations to be deleted from the table.

Figure 4:
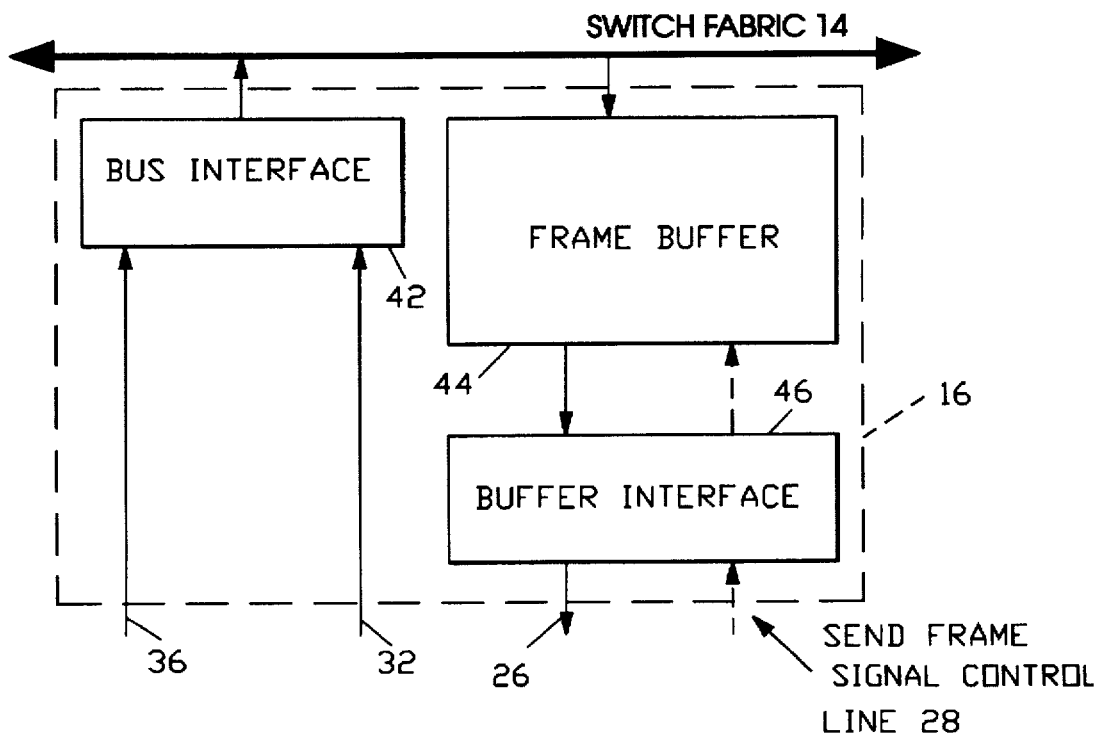
FIG. 4 shows details of the switch port interfacing the switching fabric according to the teaching of the present invention.

FIG. 4 shows a block diagram for the switch fabric interface module 16. The module includes a bus interface 42 which puts incoming frames received from the LAN media interface module 18 on bus (Switch Fabric 14) 32 onto the high speed bus. In addition to the frame on bus 32, the port number to which the frame is to be forwarded is presented to bus interface 42 on bus 36. The component for coupling the high speed bus to a port includes frame buffer 44 and buffer interface 46. The frame buffer 44 buffers frames to be transmitted through the buffer interface 46 to the LAN media interface module 18. Preferably, the frame buffer 44 is designed as a FIFO buffer where an entire frame need not be fully stored before it begins transfer through the buffer interface to the LAN media interface module 18 (FIG. 1). The frame from buffer interface 46 is transmitted over bus 26. The send frame signal on send frame signal control line 28 is made active by the LAN media interface module 18 and is used by the buffer interface 46 to begin transmission of a frame on bus 26 to the LAN media interface module 18.

As should be evident from the description of this invention, all ports in the switch are coupled through respective frame buffers to the switching fabric. When forwarding a frame to all ports, data on the bus (i.e. frame data) is written into all frame buffer memories attached to the high speed bus. In some switch fabrics (for example, in a cross bar switch), the equivalent bus interface functions may be internally connected to be able to enable/disable frame forwarding to selected ports.

FIG. 6 shows an implementation for the switch fabric 14 and connections (interface) with the frame buffer 44. The configuration allows frames to be presented simultaneously to all ports and the halting of transmission to all except the port corresponding to the matching address. Even though FIG. 6 shows a single frame buffer 44, in an actual embodiment, multiple frame buffers would be connected to the switch fabric 14. In addition, there are alternate configurations which could be used to present the frames to all ports and to stop transmission to ports with non-corresponding addresses. The alternate configurations fall within the scope of the present invention.

Still referring to FIG. 6, the switch fabric includes three sets of busses 52, 54 and 56. The bus 52 transmits the data frames to be forwarded. The bus 54 transmits control signals including a write signal on a write line. The bus 56 transmits port numbers used to select frame buffers. The port numbers on bus 56 are provided by the port number to forward frame bus 36 (FIG. 3).

Each frame buffer (one per port) has a unique port number. For example, the numbers could be selected between 01hex and FEhex. A global port number, say FFhex, corresponds to all frame buffers. If the port number is placed on bus 56 along with a write signal on the write line in bus 54, the frame buffer at the port number copies the data currently on the bus as a frame to be forwarded. Consequently, depending on the port number on the bus, each frame buffer copies frame data if the port number matches or does not copy frame data if the port number does not match.

As a consequence, the process for zero latency forwarding is as follows:

1. An incoming frame on a port causes the port number FFhex to be output to the bus.

The frame data is now passing across the bus and to all ports, all frame buffers are copying the frame data.

2. When the destination address of the incoming frame is matched to an appropriate output port number, the FFhex being output on the bus is changed to the value of the appropriate port number.

Any frame buffer that has a frame (partial) in its buffer memory because the port was busy at the time, discards the frame (i.e., reclaims the buffer storage). Any runt frames sent out on a LAN segment are cleaned-up by the receiving station.

Having described the structure of our invention, we will now describe its operation. FIGS. 5A and 5B show LAN switch A and LAN switch B with ports connected to dedicated stations on the LAN segments. FIG. 5A covers step 1A and step 1B described below and FIG. 5B describes step 2 set forth below. The shaded areas through respective switch ports indicate process step carried out on the frame flowing from a station through the switch to another station.

Still referring to FIGS. 5A and 5B, frame forwarding on an incoming frame begins immediately to all switch ports (step 1A, FIG. 5A). Simultaneously, while forwarding the frame, the destination address of the frame is compared in a table mapping addresses to port (step 1B, FIG. 5A). When the correct destination port has been determined from the table, frame forwarding is halted at all ports other than the determined destination port (step 2, FIG. 5B). The halting of frame forwarding could result in small "runt" (incomplete) frames such as 48, 50 being transmitted by the LAN switch at some output port. The station connected to the ports can handle the runt frames if they exit from the port as shown in FIG. 5B. This situation is exactly the same as when a frame is partially corrupted by a noise spike, or (in Ethernet) is a fragment left over from a collision. In the situation where a port was busy and the frame is stored in buffer 44 (FIG. 4), the frame can be deleted from the buffer before it is transmitted through respective ports. By forwarding an incoming frame simultaneously to all ports and performing address to port matching "on the fly", applicants provide a zero latency LAN switch which provides significant improvement in the latency and performance measurements.

While the invention has been particularly shown and described with reference to the preferred embodiment hereof, it will be understood by those skilled in the art that various changes to form and details may be made therein without departing from the spirit and scope of the present invention.

We claim:

1. In a LAN switch including a plurality of ports for coupling to LAN segments or single stations, a data bus, an address bus, and control bus and port cards for coupling the ports to respective ones of the buses, a method for transporting frames between the ports comprising the steps of:

for each frame receive at a port from an external source, sending the frame to the data bus;

placing on the address bus a global port number that identifies buffers to copy the frame on the data bus;

analyzing the frame;

determining a destination address; and replacing the global port number on the address bus with a unique port number that will route the frame to the destination address.

2. The method of claim 1 wherein the analyzing and determining step further includes the steps of:

providing an address/port table in each port card; and correlating an address in a frame with listings in the address/port table; and selecting the port whose associated address matches the address in the frame.

3. The method set forth in claim 2 wherein a destination address in the frame is correlated with the address/port table.

4. The method of claim 1 further including the steps of providing a global port number and a unique port number for frame buffers coupled to the busses;

at each frame buffer, monitoring the address bus;

copying the frame in frame buffers whose global port number matches the one on the address bus; and if a different port number not matching the dedicated port number for a copying frame buffer is detected on the bus during a copy cycle, abort copying of the frame.

5. The method of claim 4 further including the step of deleting partially copied frames from frame buffers that abort copying the frame.

6. The method of claim 4 further including the steps of if the different port number matches the dedicated port number for the copying buffer, continue copying until the entire frame is received and forwarding the frame to a LAN controller for external delivery.

7. A LAN switch comprising:

a housing;

a plurality of ports mounted in said housing;

a switching fabric including at least a data bus and an address bus mounted in said housing;

a plurality of port cards coupling the ports to the switching fabric, wherein each port card incudes a means for receiving and forwarding frames from and to a port and to the data bus, a frame buffer means coupling the address bus, the data bus and the means, said frame buffer means having a global port number and a unique port number;

an address matching and control means responsive to a frame received from the means to place a global port number on the address bus, analyzing the frame to determine its destination and placing a unique port number that serves the destination address in the frame on said address bus.

8. The LAN switch of claim 7 further including a controller for managing said LAN switch mounted in said housing.

9. The LAN switch of claim 8 wherein the controller includes a microprocessor subsystem.

10. The LAN switch of claim 8 wherein the controller includes a microprocessor subsystem.

11. The apparatus of claim 7 wherein the means for receiving LAN frames includes a LAN controller.

12. The apparatus of claim 11 wherein the LAN controller includes an Ethernet controller.

13. The apparatus of claim 11 wherein the LAN controller includes a Token Ring controller.

14. The LAN switch of claim 7 wherein the frame buffer means copy the complete frame from the data bus only if the global port number and the unique port number on the address bus matches the global port number and the unique port number for the frame buffer means, within a copy cycle.

15. The LAN switch of claim 14 further including means for deleting a partial copied frame from the frame buffer means.

* * * * *